July 6, 1937.  C. V. STRICKLAND ET AL  2,086,196
MACHINE FOR CUTTING AND FEEDING BLANKS TO BODY FORMING MACHINES
Filed March 27, 1933  10 Sheets-Sheet 1
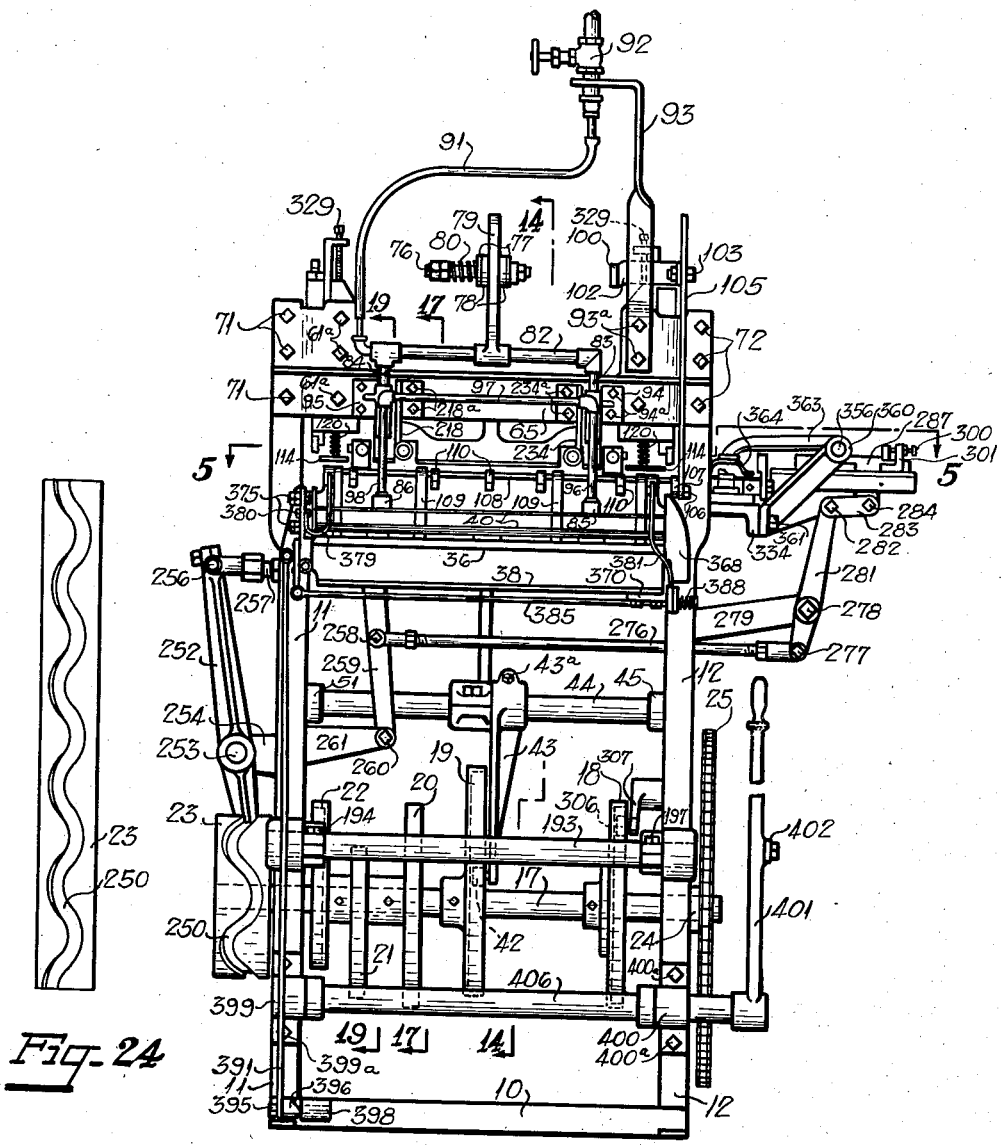
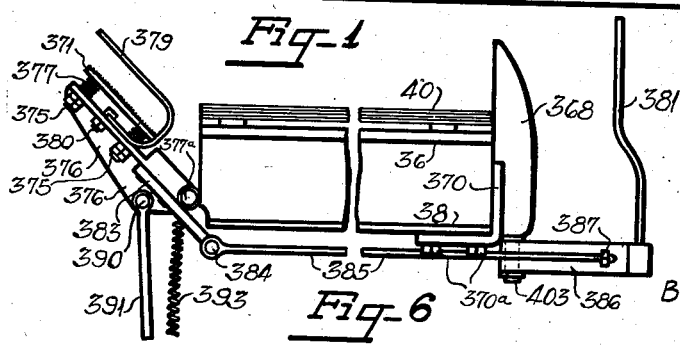
CHARLES V. STRICKLAND
WILLIAM O. MORGAN
Inventors
By Paul N Eaton
Attorney

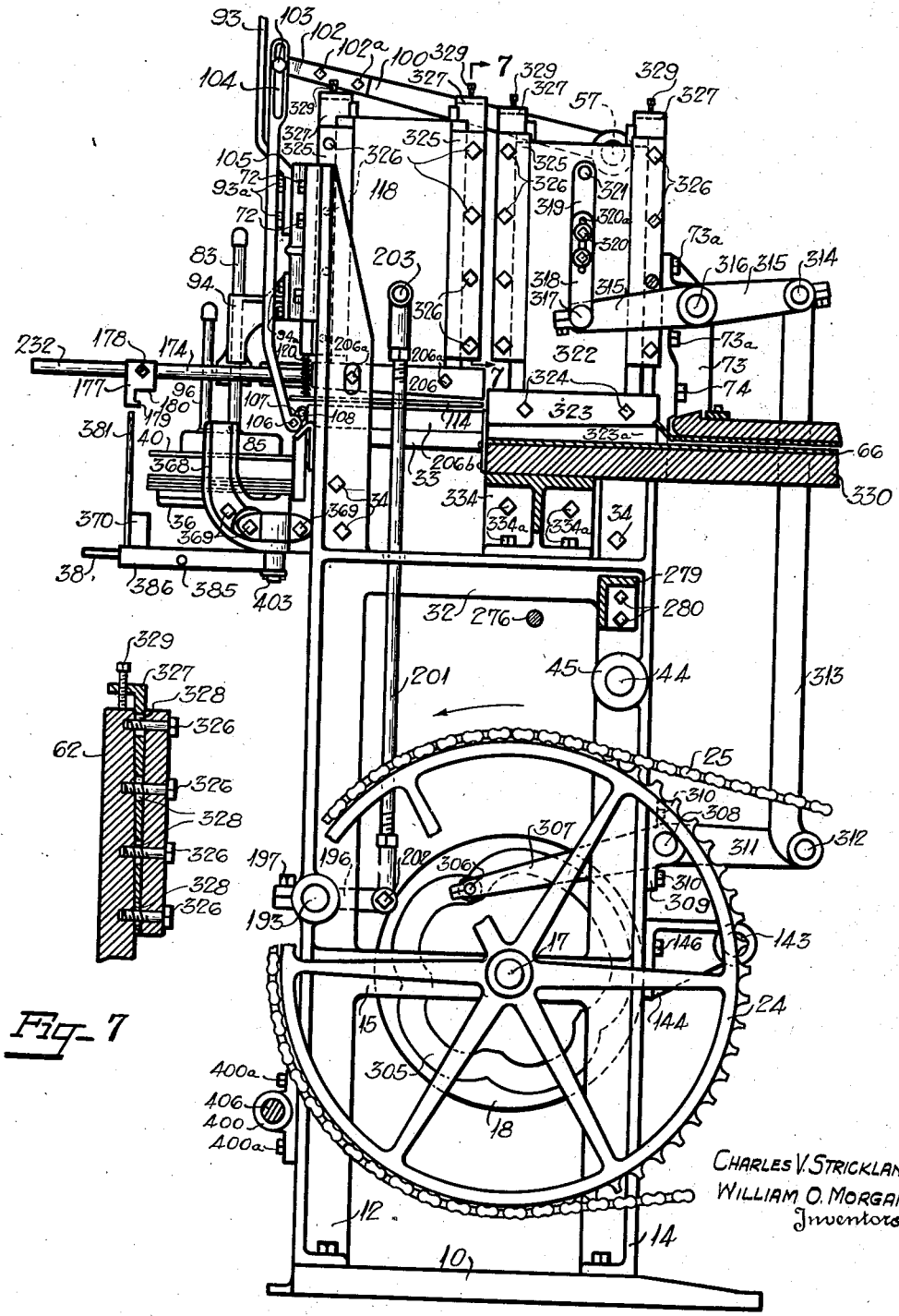

July 6, 1937.   C. V. STRICKLAND ET AL   2,086,196
MACHINE FOR CUTTING AND FEEDING BLANKS TO BODY FORMING MACHINES
Filed March 27, 1933   10 Sheets-Sheet 3

CHARLES V. STRICKLAND
WILLIAM O. MORGAN
Inventors

July 6, 1937.  C. V. STRICKLAND ET AL  2,086,196
MACHINE FOR CUTTING AND FEEDING BLANKS TO BODY FORMING MACHINES
Filed March 27, 1933   10 Sheets-Sheet 5

CHARLES V. STRICKLAND
WILLIAM O. MORGAN
Inventors

By Paul Eaton
Attorney

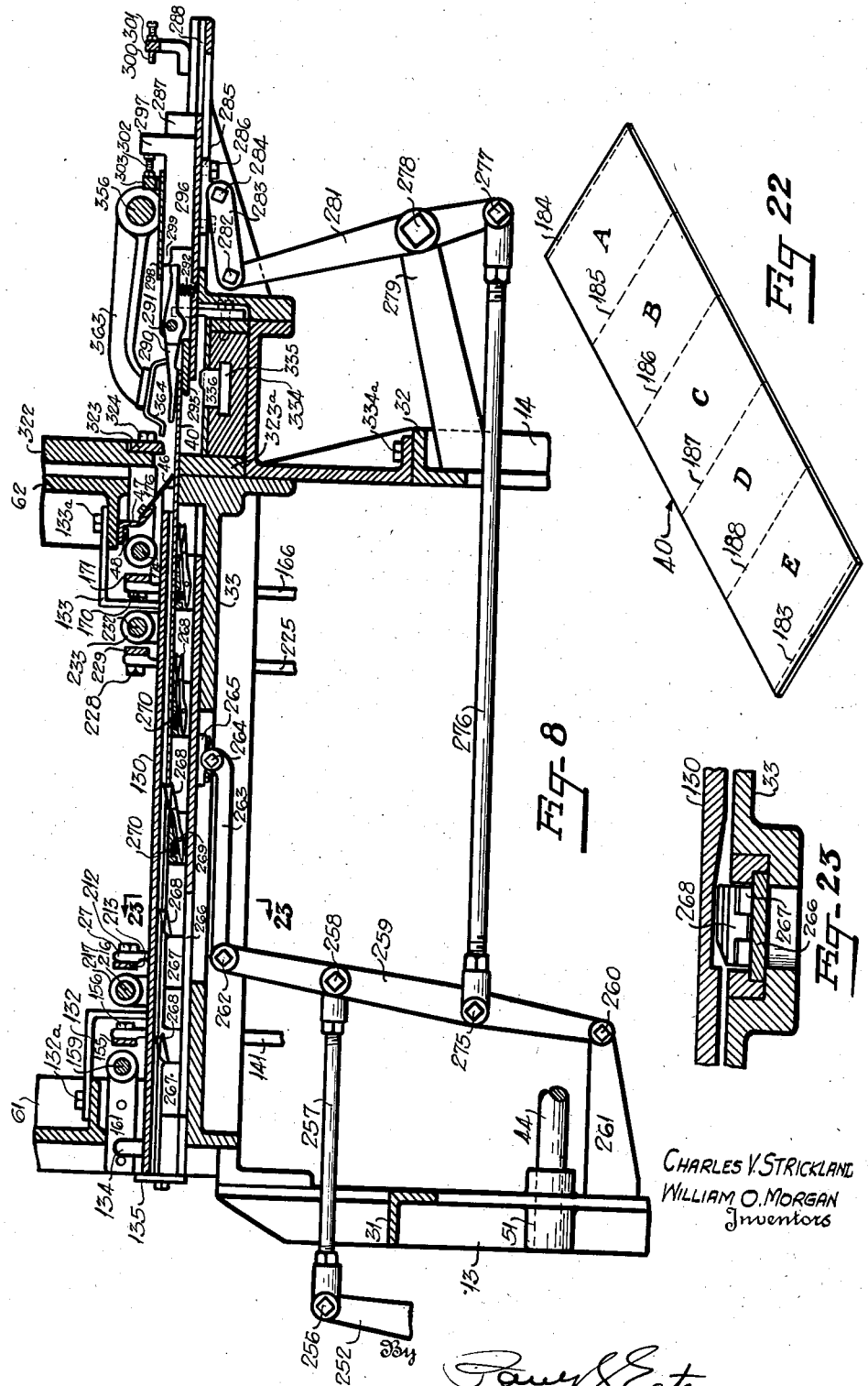

CHARLES V. STRICKLAND
WILLIAM O. MORGAN
Inventors

By Paul S. Eaton
Attorney

July 6, 1937.   C. V. STRICKLAND ET AL   2,086,196
MACHINE FOR CUTTING AND FEEDING BLANKS TO BODY FORMING MACHINES
Filed March 27, 1933   10 Sheets-Sheet 8
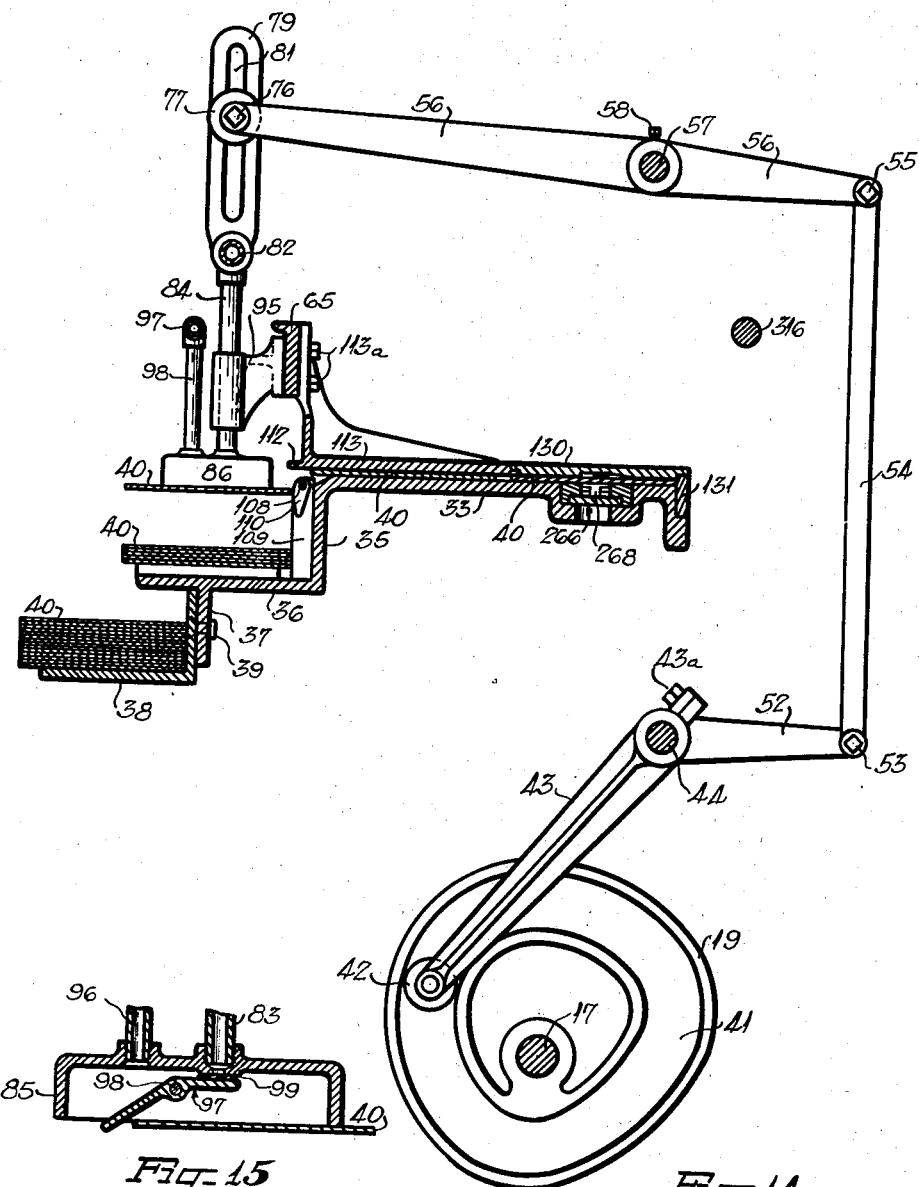
Fig-15
Fig-14
Fig-16
CHARLES V. STRICKLAND
WILLIAM O. MORGAN
Inventors
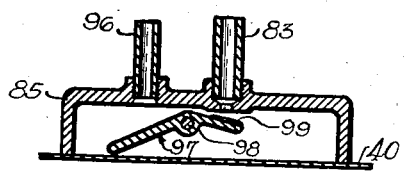
Attorney

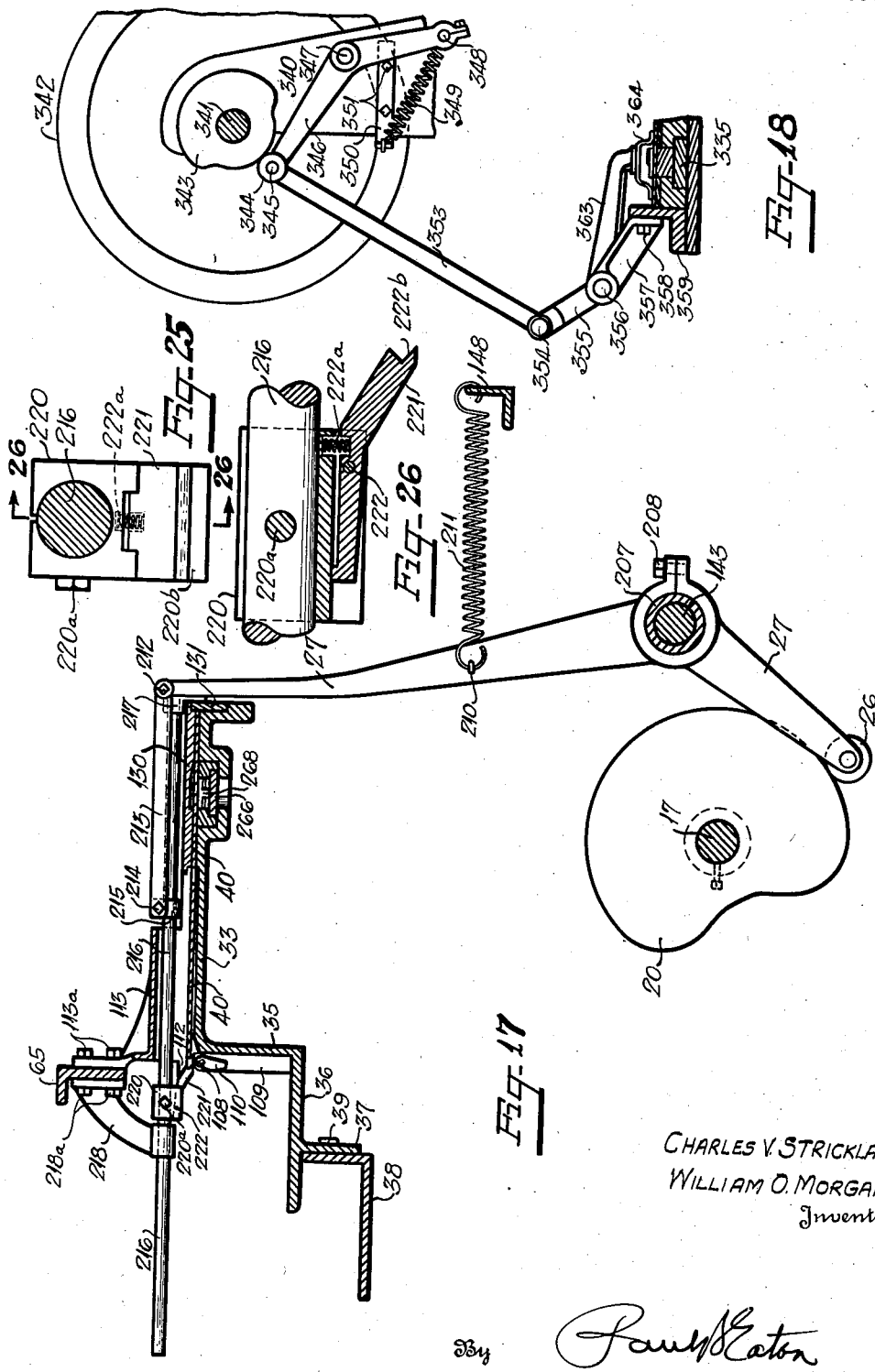

July 6, 1937.  C. V. STRICKLAND ET AL  2,086,196
MACHINE FOR CUTTING AND FEEDING BLANKS TO BODY FORMING MACHINES
Filed March 27, 1933    10 Sheets—Sheet 10
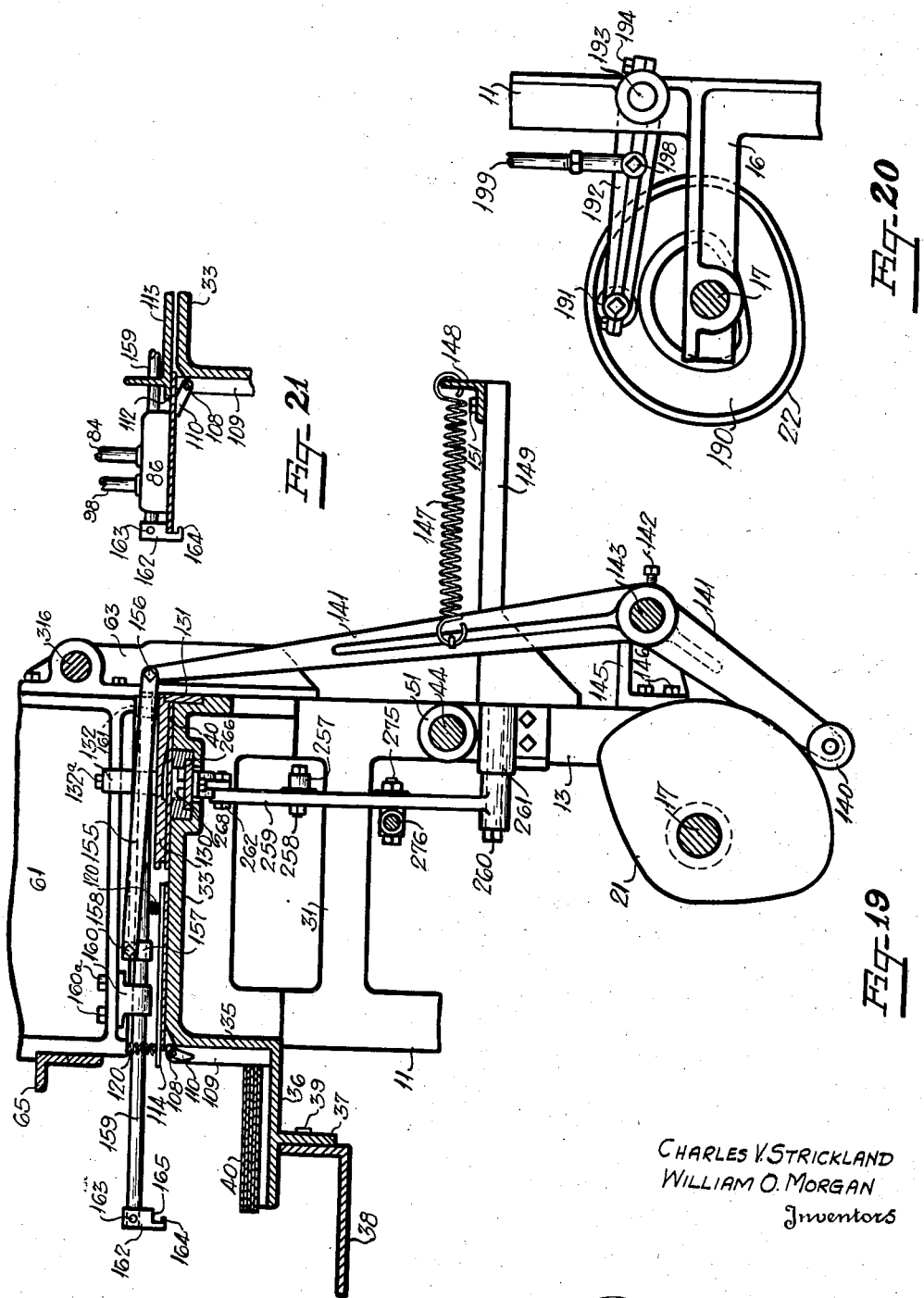
CHARLES V. STRICKLAND
WILLIAM O. MORGAN
Inventors
By Paul S. Eaton
Attorney Patented July 6, 1937

2,086,196

UNITED STATES PATENT OFFICE 2,086,196

MACHINE FOR CUTTING AND FEEDING BLANKS TO BODY FORMING MACHINES

Charles V. Strickland and William O. Morgan, Winston-Salem, N. C., assignors to R. J. Reynolds Tobacco Company, Winston-Salem, N. C., a corporation of New Jersey Application March 27, 1933, Serial No. 663,058

19 Claims. (Cl. 164—48)

This invention relates to an apparatus for cutting body blanks and feeding the same to body forming machines and more especially to one that is adapted to automatically feed sheets long enough to have cut therefrom a number of blanks into the apparatus, cut off a small portion of the ends and to also cut the sheets to proper length to form a given number of body blanks, cut the sheet into a plurality of body blanks and feed the blanks into the body-forming machine. It is a well known fact in the art of making cans and containers for tobacco and the like that the lid portion is stamped by one machine, the bottom portion by another, and the body is formed by still another.

Heretofore, it has been the practice to cut the blanks for forming the body portion of a can by machine and manually feeding the same blanks one by one into the body forming machine. This operation required very fast work on the part of the operator. Very often the body-forming machine would not be supplied with blanks as fast as the machine could take them. Furthermore, by operation of a machine for cutting these blanks and transferring the same to the body forming machine required a great deal of extra machinery and labor.

It is an object of this invention to provide an apparatus which is adapted to automatically pick up by suction means, a sheet from a stack of sheets, one at a time, and to convey the sheets into the machine where the ends are squared by a pair of knives or shears. From this position the sheets are conveyed to a second position where another knife successively cuts off short blanks of a desired length as suitable dogs move the sheet into position. Dogs are also provided for conveying these blanks into a body-forming machine.

It is a further object of this invention to provide a machine which is adapted to be operated in conjunction with the body forming machine. In other words, this machine is synchronized with the body-forming machine in order to supply a desired number of blanks per minute to the body forming machine so that it will not be overcrowded.

It is a further object of this invention to provide a machine that will automatically pick up a plurality of lithographed sheets, one at a time, and convey the same into the apparatus to be cut into blanks and also to feed the blanks into the body forming machine without the necessity of being handled manually. We also provide a very effective gripping means for gripping the body blanks while they are being cut which assists in removing the blanks from the apparatus and squares them in the chute which leads to the body-forming machine so they will be alined as they are fed into this machine. This insures the proper conveying of the body blanks into the body forming machine and, therefore, eliminates cans of inferior quality from being turned out.

It is a further object of this invention to provide adjustable means for adjusting finished overall lengths of the sheets of blank material and also adjustable means for adjusting the individual lengths of the body blanks from which the body portion of a container is formed.

It is a further object of this invention to provide means associated with the vacuum means for lifting the sheets vertically, one at a time, whereby both ends of the sheets must be raised before the vacuum will be created. In other words, a by-pass is provided connecting each of the vacuum cups in which a vacuum must be formed in both cups in order to be effective in either cup. Means are also provided for separating the sheets when the top sheet is being raised to be fed into the machine. It is a well known fact that when a plurality of sheets are disposed one above the other they have a tendency to adhere to each other, and if it were not for a roughened surface abutting one end of these sheets which is provided there would be a tendency to feed two or more sheets into the machine at one time.

Throughout the specification and claims the term "body-forming machine" has been used. In manufacturing some types of containers, such as tobacco cans, there is disposed in advance of the body-forming machine what is known as a wiring machine, which cuts away some of the edge of the blank and crimps it around a wire for hingedly connecting a lid portion thereto, and in some instances this "wiring machine" is a separate structure, while in other instances it is a portion of the body-forming machine. It is desired to be understood that the term "body-forming machine", used in the specification and claims, is to include not only the body-forming machine proper, but also the mechanism known as the wiring machine, and that the apparatus herein disclosed is adapted to cooperate with either the body-forming machine proper or with the wiring machine when the same is disposed between the apparatus and the body-forming machine.

Some of the objects of the invention having been stated, other objects will appear as the description proceeds when taken in connection with the accompanying drawings, in which—

Figure 1 is a front elevation of the apparatus;

Figure 2 is an elevation looking at the right-hand side of Figure 1 with the gripping means for removing the blanks from the machine and also the conveyor for carrying the same to the body forming machine being removed;

Figure 6 is a detailed view of the apparatus for supporting and squaring a stack of long uncut sheets before being inserted into the apparatus;

Figure 7 is a vertical sectional view taken along line 7—7 in Figure 2;

Figure 8 is a transverse sectional view through the upper portion of the apparatus and taken along line 8—8 in Figure 5;

Figure 14 is a vertical sectional view taken along line 14—14 in Figure 1 with parts omitted and showing means for raising the vacuum cups and also the lugs for guiding the sheets into the apparatus;

Figure 15 is a detailed sectional view of one of the vacuum cups taken along line 15—15 in Figure 5;

Figure 16 is a view of one of the vacuum cups taken along the same line as in Figure 15 but showing the sheet in a different position and the air valve in an open position;

Figure 17 is a vertical sectional view taken along line 17—17 in Figure 1 with parts omitted and showing the means for operation of the set of dogs to pull the sheets to their second position in the apparatus;

Figure 18 is a vertical sectional view taken along line 18—18 in Figure 4 and showing portions of the body-forming machine and means operated thereby for manipulation of the blanks prior to their entrance into the body forming machine;

Figure 19 is a vertical sectional view taken along line 19—19 in Figure 1 with parts omitted and showing the means for operation of the set of dogs to pull the sheets to their first position in the apparatus;

Figure 20 is a detailed view of the closed cam associated with the means for operation of the first set of shearing plates for shearing each end of the sheets;

Figure 21 is a detailed sectional view showing the position of the vacuum cup, the first set of dogs and the guiding lugs just as the edge of a sheet starts into the apparatus;

Figure 22 is an isometric view of a sheet before it is fed into the apparatus with dotted lines designating places where the sheet will be cut by the apparatus to form short blanks or body blanks;

Figure 23 is a sectional view taken along line 23—23 in Figure 8 with parts omitted showing the position of a dog in its uppermost position;

Figure 24 is a developed view of the periphery of the barrel cam 23 mounted on the end of the main drive shaft and showing the path in which the cam roller is adapted to travel during one revolution of the main drive shaft;

Figure 25 is a vertical sectional view looking at the right hand portion of dog member 221 mounted in cup 220 as shown in Figure 17;

Figure 26 is a vertical sectional view taken along line 26—26 in Figure 25.

Figure 3:
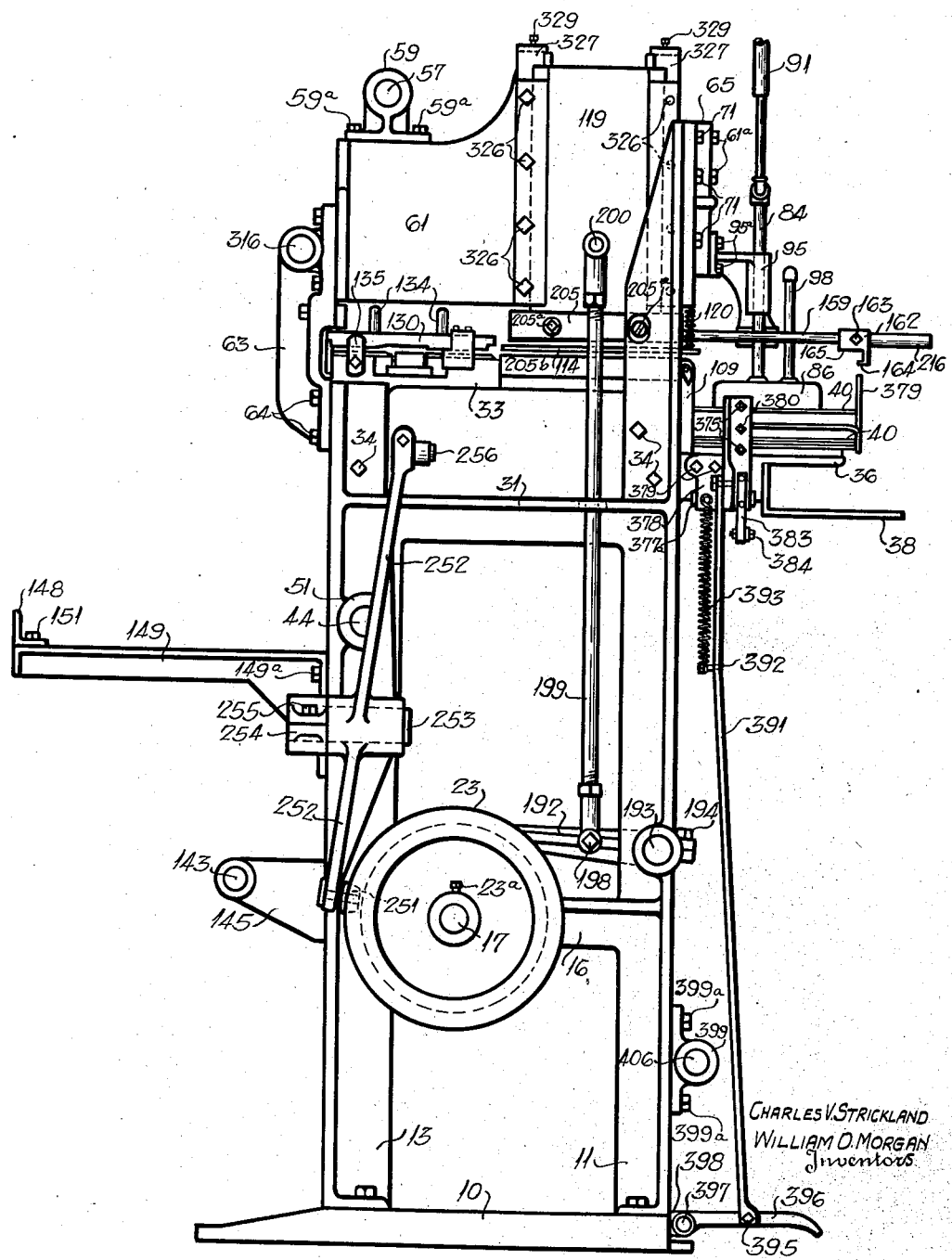
Figure 3 is an elevation looking at the left-hand side of Figure 1.

Referring more specifically to the drawings, numeral 10 indicates a suitable base plate upon which is mounted vertically disposed members 11, 12, 13 and 14 for supporting the apparatus. Disposed between members 12 and 14 and near the lower portion thereof is a horizontally disposed portion 15, and disposed between members 11 and 13 and at the same level as portion 15, is another horizontally disposed portion 16. These portions 15 and 16 are adapted to rotatably support the main drive shaft 17 of the apparatus, and upon this shaft suitable cams 18, 19, 20, 21, and 22 are fixedly mounted. On the left hand end of main drive shaft 17 (Fig. 1) a suitable barrel cam 23 is fixedly mounted, and on the right hand end of this shaft a sprocket 24 is mounted. Upon this sprocket 24 a suitable chain 25 is mounted, said chain 25 being adapted to rotate on another sprocket of the body forming machine which in turn is connected thru a series of gears to the motor. Since this apparatus is adapted to be driven from a body forming machine it is not thought necessary to show means whereby this machine is connected to the motor, which structure is conventional. It might be stated that the sprocket on the body forming machine upon which sprocket chain 25 is adapted to be mounted is of such size as to rotate the sprocket 24 and the main drive shaft 17 at such a speed that the body blanks will be cut and fed to the body forming machine by the apparatus in synchronism with the body-forming machine. In other words, the speed of the apparatus is synchronized with the body forming machine in order to deliver a blank each time the machine can take one without crowding the body forming machine. The sprocket in the body forming machine on which chain 25 is mounted has one-fifth the number of teeth thereon as sprocket 24 to cause a sheet containing five body blanks to be cut into body blanks and fed into the body forming machine. Of course, this ratio can be changed to agree with the number of body blanks in a sheet.

Disposed between vertical members or supports 11 and 13, near their upper end, is a horizontally disposed portion 31. And disposed between the supports 12 and 14 at the same level as 31 is another horizontally disposed portion 32. This portion 32 supports the conveying mechanism extending from the apparatus to the body forming machine, which will be described later. Secured on the upper ends of supporting members 11, 12, 13 and 14, by any suitable means, such as a plurality of stud bolts 34, is a suitable bed member 33. Integral with bed member 33, near the feed end, is a vertically disposed portion 35 which has at its lower end a horizontally projecting portion or support 36. Another portion 37 projects downwardly from the lower surface of support 36 and to this portion 37 is attached a suitable support 38 by any suitable means such as a plurality of rivets 39. These supports, just described, are used to support a plurality of sheets 40 which are automatically fed into the machine. Horizontally disposed member 38 acts as a supply table for a plurality of sheets 40, whereas, horizontally disposed member 36 acts as a support for a plurality of sheets 40 in position to be fed, one at a time, into the apparatus.

Figure 14 shows the mechanism that is necessary to perform this first operation, namely, the lifting of the sheets into a position where they may be pushed into the apparatus.

Closed cam 19, which is mounted on main drive shaft 17, has a groove 41 into which a suitable roller 42 is adapted to move. Roller 42 is mounted on the lower end of an arm 43, and the upper end of arm 43 is fixedly secured to horizontally disposed shaft 44 by any suitable means such as stud bolt 43a. Horizontally disposed shaft 44 is mounted for oscillation in bearings 45 and 51 in vertically disposed members 14 and 13 respectively. Fixedly mounted on shaft 44 is another arm 52 which projects to the right in Figure 14 and has secured to its right hand end as at 53 a vertically disposed link 54. Link 54 extends upwardly and at its upper end is connected as at 55 to another horizontally disposed arm 56. Intermediate the ends of arm 56 a suitable shaft 57 is provided upon which arm 56 is fixedly mounted by any suitable means such as set screw 58. Shaft 57 is mounted for oscillation in bearings 59 and 60, said bearings 59 and 60 being secured to the upper portion of sidewall members 61 and 62 by any suitable means such as stud bolts 59a and 60a.

Sidewall portions 61 and 62 (see Figs. 3, 4 and 9) are disposed directly above the bed portion 33. Sidewall portion 61 is disposed directly above the bed portion 33 and is secured at the end next to the body forming machine by a suitable bearing 63 attached to the upper portion of vertically disposed member 13, by any suitable means such as stud bolts 64. The front end of sidewall portion 61 is secured by means of stud bolts 61a to horizontally disposed member 65 which is secured to the upper end of vertically disposed members 11 and 12 by any suitable means such as stud bolts 71 and 72. Sidewall portion 62 is secured at the end next to the body forming machine to bearing 73 by means of stud bolts 73a, said bearing 73 projects downwardly (see Figs. 2 and 4) and is secured to the top of vertically disposed supporting member 14 by means of bolts 74. The front end of sidewall portion 62 is secured to horizontally disposed member 65 by any suitable means such as stud bolts 93a.

Looking again at Figure 14 it is to be noted that the left hand portion of arm 56 has a bolt 76 penetrating this end. Mounted on this bolt are two metal washers 77 and two resilient washers 78 of any suitable material such as rubber, which will produce the necessary friction. A suitable compression spring 80 is also mounted on bolt 76. Disposed between the two resilient washers 78 is a vertically disposed member 79 which has a slot 81 therein in which bolt 76 is adapted to slide. The two resilient washers 78 are disposed on opposite sides of member 79 in order to produce a friction between member 79 and these washers. The amount of this friction can be increased or decreased by turning the nuts on the end of bolt 76 which will increase or decrease the pressure on spring 80.

The lower portion of member 79 is turnably secured around the center portion of pipe 82. One end of horizontally disposed pipe 82 has another vertically disposed pipe 83 adjoining it, and at the lower end of pipe 83 is secured a vacuum cup 85. The other end of horizontally disposed pipe 82 has connected thereto a vertically disposed pipe 84 which projects downwardly and is connected to a vacuum cup 86 at its lower end. The left hand end of pipe 82 as shown in Figure 1 also has a flexible suction line 91 which leads upwardly to a suitable valve 92 for cutting off the suction to the vacuum cups as for instance when the apparatus is stopped at the end of the day. This valve 92 and its associated parts are supported by any suitable means such as an L-shaped member 93 which projects outwardly and downwardly and is connected at its lower end to member 65 by any suitable means such as bolts 93a. Vertically disposed pipes 83 and 84 are slidably mounted in castings 94 and 95 attached to horizontally disposed member 65 by any suitable means such as stud bolts 94a and 95a.

Leading upwardly from the upper portion of vacuum cup 85 is another pipe 96, and its upper end is connected to horizontally disposed pipe 97 which is also connected to the upper end of another vertically disposed pipe 98 which projects downwardly into the top of vacuum cup 86. This pipe line, just described, merely connects the two vacuum cups 85 and 86. Should either of the vacuum cups, when in their lowermost position, fail to make a complete contact on their lower surface with the top side of sheet 40 and fail to form a vacuum, then the vacuum would not be formed in either one of the vacuum cups due to this connection. Therefore, there is no danger of one end of a sheet being raised by one vacuum cup while the other end would be left disconnected from the other vacuum cup.

Referring to Figures 15 and 16, it will be noted that on the inside of each of vacuum cups 85 or 86 there is a valve member 97. Member 97 is pivoted as at 98 and has a sealing element 99 on the lighter end thereof which is adapted to open or close the port to pipe 83 or 84. When the vacuum cups engage a sheet 40 the heavier end of members 97 is raised as shown in Figure 16 and a vacuum is created between the vacuum cups and the sheet 40 as the valve member 97 is held in an open position as shown in Figure 16. When the sheet has been partially moved into the apparatus as shown in Figure 15, the left hand or heavier end of valve member 97 falls downwardly by gravity and closes ports to the suction pipes.

Referring again to Figure 14, it can be seen that as cam 19 rotates in a counter-clockwise direction the left hand end portion of member 56 is adapted to reciprocate up and down. The friction created between washers 78 and member 79 is sufficient to raise or lower the vacuum cups and their associated parts, together with a sheet 40, but whenever the bottom portion of the vacuum cups engage the sheet the cups will stop moving. Therefore, a slot 81 is provided in member 79 to allow the bolt 76 to complete its downward stroke. This also causes the vacuum cups not to stop moving downwardly until they engage the top sheet 40, regardless of the height of the stack of sheets. When the upper side of the vacuum cups engage the lower end of bearings 94 and 95 the cups and their associated parts stop in their upward movement but at the same time, bolt 76 continues in its upward movement until the upward stroke is completed. This adjustment is made in order to insure that the lower surface or periphery of the vacuum cups 85 and 86 will make firm contact with the top of a sheet 40 each time shaft 17 and cam 19 make a complete revolution. And on the next downward stroke of arm 56 the portion 79 by action of washers 78 starts downward movement to insure engagement of vacuum cups with a sheet 40 regardless of the height of a stack of sheets 40.

Fixedly secured to shaft 57 by any suitable means such as stud bolt 101 is another arm 100. On the end of arm 100 (see Figs. 2 and 4) is another arcuate member 102 secured by any suitable means such as stud bolts 102a and on the end of member 102 is a bolt 103 which is adapted to loosely slide in slot 104 in the upper portion of vertically disposed member 105. The lower portion of vertically disposed member 105 is connected as at 106 to another arm 107, said arm 107 extends upwardly and is fixedly connected to a rod 108.

Rod 108 extends horizontally on the front portion of the apparatus and is disposed in the upper portion of vertically disposed guide members 109. Also fixedly mounted on rods 108 are a plurality of beveled lugs 110 which are adapted to assist in guiding the sheets 40 into the apparatus after the sheets have been raised to approximately the same elevation as rod 108. Members 100, 102 and bolt 103 are adapted to slide up and down in slot 104 very much in the same manner as bolt 76 is adapted to slide up or down in slot 81 of member 79 previously described.

When member 102 completes its upward stroke bolt 103 is located in the uppermost portion of slot 104 and member 105 is raised upwardly which causes arm 107 to partially turn rod 108 which in turn causes lugs 110 to assume a position as shown in Figure 21. At the same time the vacuum cups 85 and 86 are in the same position as shown in this figure. Since these lugs are operated from cam 19 they engage the lower side of sheet 40 and guide a sheet into the machine each time cam 19 makes one complete revolution.

Figure 5:
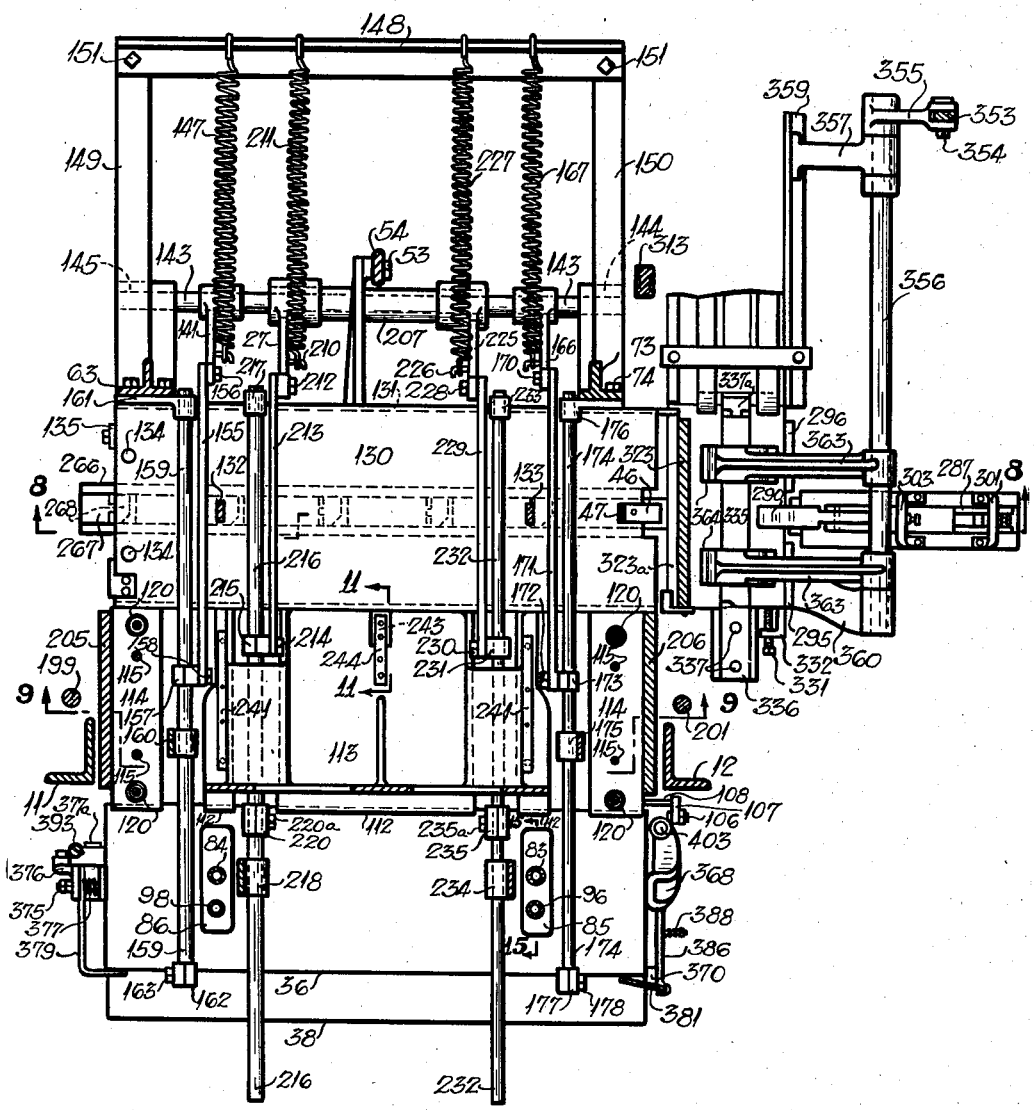
Figure 5 is a sectional plan view taken along line 5—5 in Figure 1.
Figure 9:
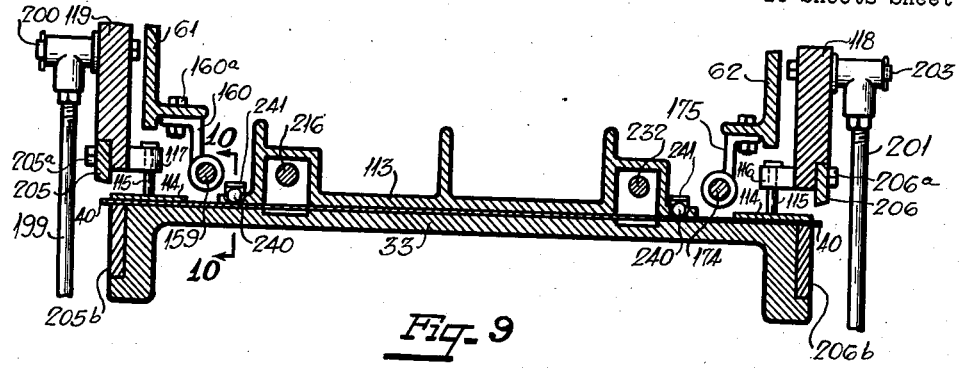
Figure 9 is a transverse sectional view thru the upper portion of the apparatus and taken along line 9—9 in Figure 5.

In the first step which has just been described, the top side of sheet 40 is brought up to the upper side of projections 112 of cover member 113 which cover member is secured to horizontally disposed member 65 by any suitable means such as bolts 113a. Disposed on each side of cover member 113 are plates 114 (Figs. 5 and 9). The lower side of plates 114 are on the same horizontal level as the lower side of projection 112 of cover 113 and serve to guide the sheet 40 into the apparatus between cover 113, plates 114 and bed portion 33. Plates 114 are held in position by suitable vertically disposed rods 115 which project upwardly and are slidably mounted in lugs 116 and 117 attached to slides 118 and 119 respectively. Two compression springs 120 are also provided for each plate 114 in order to hold the plate firmly against the sheet when the sheet is in stationary position and to hold the sheet while it is being sheared.

Referring to Figures 17 and 19, it is seen that along the rear edge of the bed member 33, a horizontally disposed guiding strip 131 is mounted, the upper edge of which is slightly above the upper portion of the bed member 33, and upon this upper edge one side of a removable cover 130 is adapted to rest. The other side of removable member 130 is adapted to rest upon the right hand portion of cover 113 as shown in Figure 14 and this cover is held against upward movement by two brackets 132 and 133 (Fig. 8) which are secured to sidewall members 61 and 62 respectively by means of stud bolts 132a and 133a. A suitable latch 135 is provided at the left hand end of Figure 8 to hold the cover 130 in position and also knobs 134 are provided for removing or replacing the cover.

After the top sheet 40 has been raised to the lower side of projection 112 and the bottom of plates 114 another device comes into action so as to place the sheet into the apparatus (see Fig. 19). Fixedly secured to shaft 17 is an open cam 21 which is adapted to be contacted by a suitable roller 140 secured on the lower end of bell crank lever 141. Bell crank lever 141 is fixedly mounted on a horizontally disposed shaft 143 by any suitable means such as set screw 142. One end of shaft 143 is rotatably mounted in bearing 144, while the other end is rotatably mounted in bearing 145, said bearings 144 and 145 being secured to vertically disposed members 14 and 13 by any suitable means such as stud bolts 146. The upper leg of bell crank lever 141 projects upwardly and has secured about midway its upper portion a suitable tension spring 147. The other end of tension spring 147 is connected to angle member 148 which is mounted on the end of brackets 149 and 150 by means of bolts 151, the other end of brackets 149 and 150 being secured to supporting members 13 and 14 respectively by any suitable means such as stud bolts 149a. This spring causes cam roller 140 to contact open cam 21 at all times. The extreme upper end of bell crank lever 141 is pivoted to a horizontally disposed link 155 as at 156. The other end of horizontally disposed link 155 is connected to cuff member 157 as at 158. Cuff member 157 is fixedly mounted on horizontally disposed rod 159, said rod 159 being slidably mounted in bearing members 160 and 161. Member 160 is connected to sidewall member 61 by any suitable means such as stud bolts 160a. Member 161 is connected to vertically disposed member 63. On the front end of rod 159 is secured hook member 162 by any suitable means such as stud bolt 163. The lower portion of this hook member 162 has suitable hook 164 and a shoulder portion 165. Shoulder portion 165 and the lower side of plates 114 as well as the lower side of projection 112 serves to retard the upward movement of the body blank 40 when the vacuum cups are in their extreme topmost position.

Fixedly secured to shaft 143 is another vertically disposed arm 166 which is identical in all respects to the upper portion of bell crank lever 141 with the portion below the shaft being omitted. This upper portion is adapted to work with the apparatus just described and is operated by cam 21 in the same manner as bell crank lever 141.

Midway the ends of vertically disposed member 166 is another tension spring 167, identical in all respects to tension spring 147, and this spring is secured to horizontally disposed angle member 148. The upper portion of member 166 is pivoted as at 170 to a link 171. The other end of link 171 is pivoted to cuff member 173 by any suitable means such as bolt 172. Cuff member 173 is fixedly secured to rod 174 which is mounted in bearings 175 and 176 which are similar in all respects to bearings 160 and 161 respectively. On the front end of this rod a hook member 177 secured by means of a bolt 178 which has a hook portion 179 on the lower end thereof and a shoulder portion 180. Hook members 162 and 177 are adapted to move inwardly toward the apparatus simultaneously and operate together to slide a sheet 40 into the machine when the vacuum cups 85 and 86 have raised it to the desired position.

It is evident that each time shaft 17 makes one complete revolution that hook members 162 and 177 will force one sheet 40 into the apparatus which completes the second step in the operation of the apparatus.

In Figure 22, I show an isometric view of a sheet 40 before it enters the apparatus. The dotted lines which are represented by reference characters 183, 184, 185, 186, 187 and 188 represent the lines upon which the body blank is cut by the apparatus to form the individual body blanks from which the body of the container is made.

After the second step in the operation of feeding a sheet through the apparatus has been performed, namely the pushing of the sheet 40 into the first position in the apparatus by dog or hook members 162 and 177, the next operation to be performed is to shear off the ends of the sheets along dotted lines 183 and 184. This mechanism is operated by the closed cam 22 which is fixedly mounted on shaft 17. Cam 22 has a groove 190 in which a cam roller 191 is adapted to travel. Cam roller 191 is secured to the left-hand end of cam lever 192 (see Figs. 3 and 20) and the other end of lever 192 is secured to shaft 193 by any suitable means such as stud bolt 194. Shaft 193 is mounted for oscillation in vertically disposed members 11 and 12. The other end of shaft 193 has arm 196 which is fixedly mounted on this shaft by any suitable means such as stud bolts 197. Secured as at 198 to arm 192 (Fig. 3) is a vertically disposed rod 199 which projects upwardly and is connected to slide 119 as at 200. In Figure 2 it is to be noted that a similar rod 201 is secured to the right hand end of arm 196 as at 202 and this rod projects upwardly and is secured to slide 118 as at 203.

As shaft 17 rotates it is evident that rods 199 and 201 together with slides 119 and 118 respectively make a complete stroke or oscillation to shear the ends of a sheet 40. The lower portion of slide 119 has fixedly secured thereto shearing plate 205 by any suitable means such as stud bolts 205a, and slide 118 has a shearing plate 206 secured to the lower portion thereof by any suitable means such as bolts 206a. Each time shaft 17 and cam 22 make a complete revolution these shearing plates 205 and 206 move downwardly to shear the end of the sheet 40 along the lines 183 and 184.

After the third operation has been performed, namely the shearing of the two end portions from the sheet 40, the sheet is moved to a second position in the apparatus by means shown in Figure 17. This mechanism is operated by cam 20 which is fixedly mounted on main drive shaft 17. Cam 20 is adapted to be contacted by a roller 26 which is mounted on the lower end of bell crank lever 27. The lever 27 is fixedly mounted on sleeve 207 by means of stud bolts 208, and sleeve 207, in turn is mounted on shaft 143 and is adapted to oscillate thereon.

The upper portion of bell crank lever 27 has secured as at 210 a suitable tension spring 211 and the other end of tension spring 211 is secured to angular member 148. Spring 211 holds cam roller 26, at all times, in contact with the surface of open cam 20. The upper portion of bell crank lever 27 is pivoted as at 212 to horizontally disposed member 213 and the other end of member 213 is pivoted as at 214 to a cuff member 215. Cuff 215 is fixedly secured to sliding rod 216 which is adapted to slide in bearing 217 which is secured to plate 131 and in member 218 which is secured to horizontally disposed member 65 by means of bolts 218a. Secured on rod 216 and between bearings 217 and 218 is another cuff member 220 which is fixedly secured on this rod by means of a stud bolt 220a. The lower portion of this cuff member 220 has a dog 221 pivoted as at 222 and the lowermost portion of this dog is adapted to contact the edge of a sheet 40 when it is in its first position in the apparatus and slide it to a second position, namely to push it until the edges contact plate 131.

By referring to Figures 25 and 26 the construction of dog member 221 is seen more clearly. Slightly to the right of pivot point 222 a suitable coil spring 222a is provided to keep the right hand portion of dog 221 in a downward position. Of course, as another sheet enters the apparatus this portion will be forced slightly upward to allow the sheet to enter but when the sheet has been forced past the dog member 221 by members 162 and 167 which have been previously described, notch 222b engages the sheet and carries it to the second position in the apparatus.

Fixedly secured on sleeve 207 is another vertically disposed arm 225. This arm is identical in all respects to bell crank 206 except that the lower portion which has a cam attached thereto is omitted. This arm 225 projects upwardly and has secured as at 226 a suitable tension spring 227 similar in all respects to tension spring 211. The other end of spring 227 is secured to angular member 148 and assists spring 211 in keeping cam roller 26 against cam 20 at all times. The upper portion of arm 225 is pivoted as at 228 to link 229, and the other end of link 229 is secured as at 230 to a cuff 231, said cuff 231 being fixedly secured on rod 232. This rod is adapted to slide in bearing 233, attached to plate member 131, and also in bearing 234 which is attached to horizontally disposed member 65 by means of stud bolts 234a.

Fixedly secured on rod 232 by means of stud bolt 235a and between bearings 233 and 234 is a cuff member 235, and this cuff member has a dog 221 mounted therein pivoted as at 222. This is not shown in the drawings because it is identical in all respects to the cuff member 220 and dog 221 shown on rod 216 (see Fig. 17) which has previously been described. These cuff members 220 and 235 are adapted to move inwardly simultaneously and push each end of the sheet 40 to its second position in the apparatus.

Figure 10:
Figure 10 is a sectional view taken along line 10—10 in Figure 9.

By referring to Figures 5, 9 and 10 it will be noted that balls 240 are placed in hemispherical cavities in the upper portion of cover 113 and are held down against sheet 40 by means of leaf spring 241 secured in the center by any suitable means such as screws 242. A pair of these balls are disposed on each side of the machine in order to hold the sheets 40 in the proper position when the dogs or hook members 162 and 177 push sheet 40 into the apparatus. They also serve to retard any backward movement of the sheet which might tend to take place due to movement in the apparatus since the balls exert a downward pressure on the top of the sheet 40.

Figure 11:
Figure 11 is a sectional view taken along line 11—11 in Figure 5.

By referring to Figures 5 and 11 it will be seen that another dog 243 is disposed with the right hand end of said dog (Figure 11) on the division line between the first and second position of the sheet in the apparatus. This also serves to hold the sheet 40 down on the bed member 33 and also to retard any backward movement which might take place.

After the fourth operation has been formed by the apparatus, namely the pushing of sheet 40 to the second position in the apparatus the sheet is moved endwise of itself and laterally through the apparatus for the first cutting operation. Let us assume (see Fig. 22) that the sheet as shown will be inserted into the machine with the side shown farthest from the observer entering the machine first. Since this sheet has been sheared along lines 183 and 184 by previous operations of the apparatus the sheet while in its second position will be moved endwise of itself and laterally of the apparatus one space, namely into such position as to cut off blank "A" along dotted line 185. The apparatus for performing this operation is shown in Figures 1, 3, 5 and 8. Fixedly mounted on the end of shaft 17 by any suitable means such as a set screw 23a, is another barrel cam 23 (Figs. 1 and 24). This barrel cam 23 has a zig-zag groove 250 which has five peaks and five depressions, and into this groove a cam roller 251 mounted on the lower end of rocker shaft 252 is adapted to operate. Lever 252 is mounted for oscillation on stud member 253 and the other end of stud member 253 is fixedly mounted on support 254 by means of stud bolt 255 and in turn this support is secured to vertically disposed supporting member 13. The upper end of rocker shaft 252 is pivoted as at 256 to a horizontally disposed rod 257, and the other end of rod 257 is pivoted as at 258 to a vertically disposed arm 259.

Arm 259 is secured at its lower end as at 260 to a bracket 261, said bracket 261 being secured by any suitable means to vertically disposed supporting member 13. Arm 259 is pivoted at its upper end as at 262 to a horizontally disposed link 263. The other end of link 263 is pivoted as at 264 to bracket 265 attached to the lower side of reciprocating slide member 266. Secured to slide member 266 are a plurality of boxes 267 which have mounted therein dogs 268 pivoted as at 269. These dogs 268 are normally held in a position shown in the left-hand portion of Figure 8 by a suitable compression spring 270 mounted inside of the box. These dogs 268 have a beveled surface 271 disposed toward the feed end of the apparatus (see Fig. 23) which causes the dogs to be forced downwardly when the edge of the sheet touches them. By looking at cam 23 and groove 250 it can be seen that five oscillations will be effected each time shaft 17 makes one complete revolution. In other words, when a sheet 40 has been moved to the second position in the apparatus, it will be moved to five different positions, laterally of the machine, each time cam 23 makes a revolution and each time it is moved to a position it will be sheared off to form body blank, namely along dotted lines 185, 186, 187 and 188.

It should be stated here that the dogs 268 mounted in boxes 267 do not push the sheet a distance which is equal to the complete width of a body blank, namely the width of either one of the individual body blanks of A, B, C, D, or E. For example, these dogs push body blank "A" in the first lateral movement to a position approximately two thirds of the width of the body blank, and at this point a gripping means is adapted to grip the edge of body blank "A" and pull it to the position where it will be sheared. This is the sixth operation of the apparatus and means for carrying out this operation is operated by the same means that operates the dogs 268, namely cam 23 and arm 259.

Figure 12:
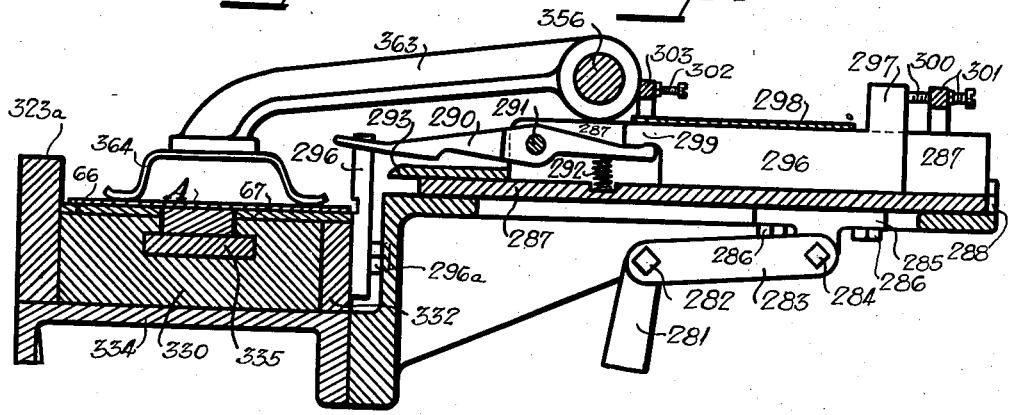
Figure 12 is an enlarged sectional view of the right-hand portion of Figure 8 but showing the gripping means for removing the body blanks from the machine in an extreme right-hand position.

The gripping means for performing the sixth operation, namely the pulling of the sheet or part thereof the remaining distance out of the apparatus is operated by barrel cam 23 as heretofore stated, and it will be noted that there is provided a suitable horizontally disposed rod 276 pivoted as at 275 to the lower portion of lever arm 259. The other end of rod 276 is pivoted as at 277 to the lower end of vertically disposed lever arm 281, said arm 281 being secured intermediate its ends as at 278 to bracket 279. Bracket 279 is secured to vertically disposed support 14 by any suitable means such as stud bolts 280. The upper end of lever arm 281 is pivoted as at 282 to a link 283, and the other end of link 283 is pivoted as at 284 to member 285 which is secured to the lower portion of slide 287 by any suitable means such as stud bolts 286. The lower portion of slide 287 is adapted to reciprocate in grooves 288 disposed on each side of the slide each time a sheet is pushed forward. Mounted in one end of slide 287 is a gripper 290, pivoted as at 291, which has a suitable compression spring 292 mounted under the right hand end of the gripper as shown in Figures 8 and 12 to normally hold the left hand end of the gripper in contact with the top portion of the sheet. Mounted on top of the lower portion of slide 287 and directly beneath the gripping end of gripper 290 is a beveled base member 293 upon which the lower side of the body blank is adapted to rest when the left hand portion of gripper 290 is in operation. In Figure 8 the gripper is shown in its extreme left hand position immediately after it has gripped the end portion of the sheet and it is now in position to pull the sheet from the apparatus. Gauge plates 295 and 296 which are secured to the body portion of the conveyor to the body forming machine by any suitable means such as bolts 295a and 296a serve to abruptly stop the sheet when it has been pulled out of the apparatus the desired amount. When the sheet touches gauge plates 295 and 296 the gripper slips off the sheet and continues to the right (Fig. 8). Since these gauge plates are set at right angles to the lateral path of travel of the sheet the sheet is forced into an absolutely square position before the cutting operation takes place.

Slide 287 has slidably mounted therein another member 296 which has a lug 297 integral therewith. This member 296 is confined in slide 287 by means of a plate 298. The left hand end portion of member 296 as shown in Figure 12 has another projection 299. It should be noted in Figure 12 the slide member 287 as well as member 296 and the gripper 290 are in their extreme right hand position. When slide 287 is forced into the position shown the projection 297 is forced against set screw 300 mounted in bracket 301. This obstruction causes member 296 to stop but slide member 287 and the gripping mechanism continues to the right until the right hand portion of gripper 290 is forced under projection 299 which causes an opening between the left hand portion of gripper 290 and member 293. Then the gripper moves in this position to the left until the sheet is in this opening between the left hand end of gripper 299 and member 293 and at this moment projection 297 contacts screw 302 mounted in bracket 303. After this contact is made sliding member 296 is forced to stop but slide 287 and gripper 290 move still farther to the left which causes the right hand end portion of gripper 290 to move from under projection 299 which, in turn will cause the gripper to grip the sheet.

After the sixth operation has been performed, namely the gripper having pulled the sheet from the machine and squared it against the gauge plates 295 and 296, a second shearing operation takes place to clip the body blanks from the sheet. By referring to Figures 1 and 2 the mechanism for performing this operation is clearly shown. Fixedly secured on shaft 17 is a closed cam 18, said closed cam 18 having a groove 305 therein in which a cam roller 306 is adapted to travel. Roller 306 is mounted on the lower end of arm 307 and the other end of arm 307 is fixedly secured to a stud 308 which is adapted to rotate in bearing 309 which bearing is secured to vertically disposed member 14 by any suitable means such as stud bolts 310. Another arm 311 is also fixedly secured to stud 308 and this arm projects horizontally to the right as shown in Figure 2 and has pivoted on the end thereof as at 312 another vertically disposed link 313. Link 313 projects upwardly and is pivoted as at 314 at its upper end to one end of a horizontally disposed arm 315. Arm 315 is mounted at its central portion on a shaft 316, said shaft 316 being mounted in suitable bearings 73 and 63 on the upper end of vertically disposed supports 14 and 13 respectively. From shaft 316 arm 315 projects horizontally to the left in Figure 2 and has pivoted on its extreme left hand end as at 317 another vertically disposed link 318. Secured to the upper end of vertically disposed link 318 is another link 319 by any suitable means such as bolts 320 penetrating slots 320a in link 318 and holes in the lower portion of link 319. This slot 320a is provided in order to secure the proper adjustment between point 317 and point 321 where the vertically disposed link 319 is secured to the slide 322.

Slide 322 has a suitable shearing plate 323 secured to the lower end thereof by any suitable means such as stud bolts 324. This plate is adapted to cut the individual body blanks from a sheet 40 when it has passed through the apparatus. By referring to Figure 2, it will be noted that the cam roller 306 is adapted to operate in groove 305 in cam 18. It will also be noted that the cam roller, as the cam makes one complete revolution, is adapted to rise and fall four times. Each time this cam rises and falls the blade 323 is adapted to rise and fall, which means that sheet 40 as shown in Figure 22 will be sheared along lines 185, 186, 187 and 188. After the blank has been cut along line 188 the blade will not fall again for that sheet but will dwell due to the fact that the sheet along line 184 has been sheared by a previous apparatus already described. In Figure 2 the cam 306 and shearing plate 323 are shown in a position immediately after sheet 40 has been sheared along line 188. When shearing plate 323 rises again blank "E" will be conducted into the same position by dogs 266 and gripper 290 as was occupied by blanks A, B, C and D previously but shearing plate 323 will not make a downward stroke at this time due to the fact that groove 305 in cam 18 will not allow roller 306 to fall downwardly at this time.

Slides 118 and 119 which operate shearing plates 295 and 296 on their lower end in the third operation and also slide 322 which has shearing plate 323 on its lower end for performing the seventh operation are adapted to move up and down in guides or slide gibs which will be designated by reference character 325. Since these are all alike they are given a similar reference character in each case, and these slide gibs are secured to the sidewall portion 61 or 62 by any suitable means such as stud bolts 326. By referring to Figure 7 an adjustable feature of these slide gibs will be shown more clearly. Between the slide gibs and the sidewall portion 61 or 62 there is provided a vertically disposed wedge 327 which has a plurality of slots 328 which are adapted to encircle stud bolts 326. By moving this wedge 327 up or down the cutting edges of the shearing plates can be adjusted with relation to fixed shearing plates 295b and 296b and 323a. Set screw 329 is placed in the outstanding leg in the upper portion of wedge 327 in order to determine the exact amount of adjustment to be made in each case.

Figure 13:
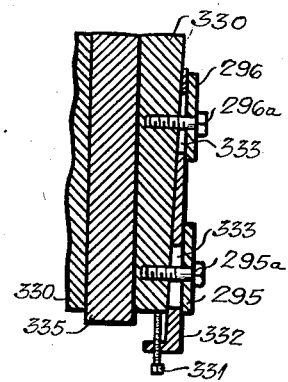
Figure 13 is a sectional plan view thru the lower portion of the conveyor for feeding the body forming machine showing the means for adjusting the width of the body blank.

The means for adjustment of the width of the individual body blanks can be obtained by means shown in Figure 13. In this figure there is provided another wedge 332 which is adapted to fit between the bed portion 330 of the conveyor which leads to the body forming machine and the gauge plates 295 and 296. This wedge 332 has two slots 333 disposed therein, thru which bolts 295a and 296a are adapted to penetrate. Also in the outstanding leg of wedge 332 a suitable set screw 331 is threadably mounted in order to determine the amount that the wedge goes in or out. It is evident that by pushing the wedge in, that the gauge plates 295 and 296 will be pushed to the right in Figure 13 and consequently the body blank will be wider when cut. By this means the delicate adjustment as to width of the body blank which has to be made can usually be made by manipulating this set screw 331 and wedge 332. After the shearing takes place by the knife 323 mounted on slide 322 the eighth operation now takes place, namely the pushing downwardly of the body blank onto the plates 66 and 67 disposed in bed plate 330 so that it will lie flat on the upper portion of the plates 66 and 67 in the conveying mechanism from whence it will be conveyed to the body forming machine. One end of bed member 330 of the body forming machine is adapted to rest on a suitable bracket 334 secured to the apparatus by any suitable means such as stud bolts 334a. The bed portion 330 of the conveyor has a suitable slide 335 which is adapted to oscillate therein. This slide is operated by the mechanism connected to the body forming machine but a brief description here is necessary in order to make the invention clear.

On this slide a suitable dog 336 is secured on the end thereof by any suitable means such as bolts 337 and farther toward the body forming machine are other dogs such as 337a which are adapted to convey the body blanks into the body forming machine as slide 335 oscillates. This slide is adapted to make one complete oscillation each time a body blank is cut by shearing plate 323 from sheet 40 or when the last blank in a sheet is deposited on plates 66 and 67. In other words, for each revolution of the main drive shaft 17, five complete oscillations are made by slide 335.

Figure 4:
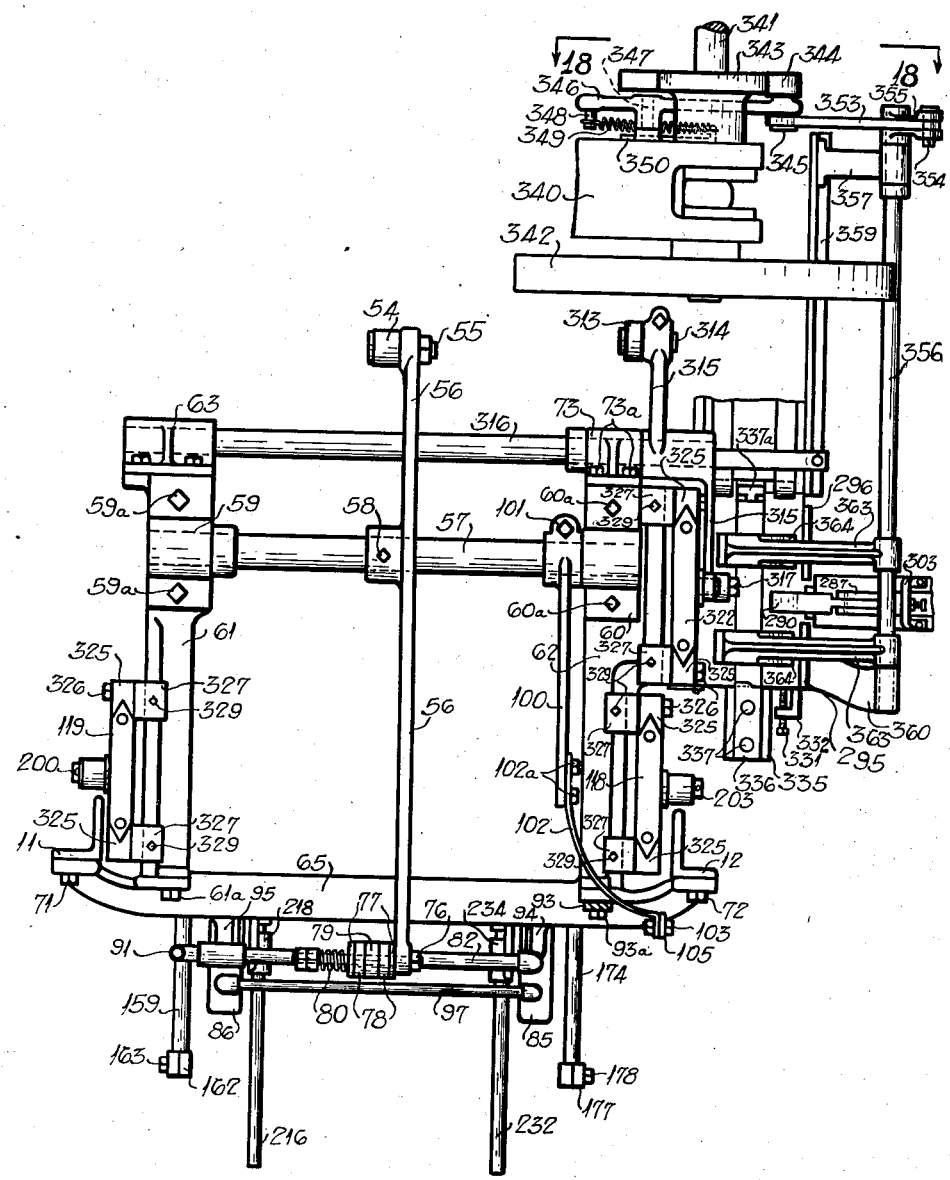
Figure 4 is a top plan view of the apparatus.

By referring to Figures 4, 5 and 18 the mechanism for this operation is shown, namely the pushing down of individual body banks into the conveyor. The reference character 340 denotes a portion of the body forming machine which has mounted therein a conventional shaft 341 with a suitable balance wheel 342 mounted on the end thereof. Shaft 341 is geared up with the motor to make exactly five revolutions each time the main drive shaft 17 of the apparatus makes one revolution.

Mounted on shaft 341 of the body-forming machine is a cam 343, said cam 343 being adapted to be contacted by a roller 344 secured on one end of bell crank lever 346 by any suitable means such as bolt 345. Bell crank lever 346 is secured to the body forming machine as at 347 and the lower end of bell crank lever 346 has secured thereto as at 348 a suitable spring 349. The other end of spring 349 is secured to a bracket 350 which in turn is secured by means of stud bolts 351 to the portion 340 of the body forming machine. Spring 349 is adapted to keep cam roller 344 in contact with the periphery of open cam 343 at all times.

Secured to the end of bell crank lever 346 by bolt 345 is another downwardly projecting link 353 which is pivoted at its lower end as at 354 to an arm 355 which arm is fixedly mounted on shaft 356 which is disposed longitudinally of the machine. One end of shaft 356 is mounted for oscillation in bearing 357 which bearing is secured to angle member 359 of the body making machine by any suitable means such as stud bolts 358. The other end is mounted in bearing 360 which, in turn, is secured to bracket 334 by any suitable means such as stud bolts 361.

Fixedly mounted on shaft 356 and between bearings 357 and 360 are arms 363 which have secured on the projecting ends pressure members 364. These pressure members are adapted to assume a position as shown in Figure 12 each time a body blank is cut off from the sheet. In other words, each time shaft 341 on the body making machine makes one revolution, this apparatus is moved downwardly and since this shaft makes five revolutions each time main drive shaft 17 of the apparatus makes one revolution the feelers or pressure members will naturally be caused to oscillate each time an individual body blank is sheared. The arms 363 and pressure members 364 are shown in uppermost position in Figure 8. Whereas, in Figures 12 and 18 they are shown in the lowermost position. This lowermost position is assumed immediately after the body blank has been sheared or the last one in a sheet deposited in the conveyor and this apparatus holds each body blank in position on the top of the chute while the slide 335 and dog 337 oscillate to move the blank longitudinally of the machine into the body forming apparatus.

Disposed on the side of supports 36 and 38 for supporting a stack of sheets 40 is an abutment member 368. This abutment member is secured by any suitable means such as stud bolts 369. This member is used to even up one end of a stack of sheets 40 and to the bottom of the support stand 36 an angular member 370 is secured by any suitable means such as stud bolts 370a. This is used also to even up the ends of the sheets as they are placed on this support stand.

Disposed on the other side of support stand 36 is a vertically disposed member 371 and this member 371 has corrugations in the side which are adapted to press against one end of a plurality of sheets 40. These corrugations tend to separate the sheets when the vacuum cups pick up the topmost sheet. It is a well known fact that flat pieces of tin and the like disposed on top each other will have a tendency to adhere to each other. When the vacuum cups 85 and 86 pick up the topmost sheet then the corrugations in member 371 will be inserted by springs 377 between the top sheet and the next succeeding sheet and prevent the picking up of more than one sheet at a time. It is evident that the suction between the cups and the sheet is greater than the friction which might be caused on the end of the top sheet by the corrugated surface in the vertically disposed member 371. Member 371 is secured by means of bolts 375 to a vertically disposed bracket 376. Encircling bolts 375 and between member 371 and bracket 376 are compression springs 377. These compression springs are adapted to keep member 371 resiliently in contact with the end of sheets 40 at all times and tend to push them against the abutment member 368 to keep them squarely positioned and even on the support.

Bracket 376 projects downwardly and is secured as at 377a to the side of support 36. Stud 377a is disposed in a suitable bearing 378 which is secured to the side of support 36 by means of stud bolts 379 and this member is adapted to be turnably mounted on stud 377 shown in Figure 6. A guide wire 379 is also secured to bracket 376 by means of bolt 380. This wire works in conjunction with another guide wire 381 disposed at the other end of the body blanks. Sometimes another sheet will stick to the bottom of a picked up sheet and when the said second sheet is caused to fall back onto the stack of sheets by the serrated portion 371, these wires 379 and 381 guide the released sheet and cause it to fall back onto the stack of sheets in proper position. A nut 387 is disposed on one side of pivoted member 386 and a spring 388 is disposed on the other side to resiliently hold this member and wire 381 in position.

Another vertically disposed member 391 is pivoted to the lower side of bracket 376 as at 390, and this member projects downwardly and has secured thereto as at 392 a suitable tension spring 393. This spring is secured at its upper end to bearing 378 and tends to hold bracket 376 and its associated parts in a vertical position at all times. Member 391 projects downwardly near the bottom portion of the machine and is connected as at 395 to a foot lever 396. The other end of foot lever 396 is turnably secured to a stud 397 mounted in a lug 398 which lug 398 is secured to base plate 10.

Bracket 376 has a downwardly projecting member 383 secured thereto and on the lower end of this member a horizontally disposed rod 385 is pivoted as at 384. This rod penetrates member 386 and is adapted to connect bracket 376 and its associated parts with member 386.

By applying pressure to the right hand portion of foot member 396 as shown in Figure 3, the members 376, 379, 386 and 381 assume a position shown in Figure 6 and in this position a plurality of sheets 40 are adapted to be placed on the support 36.

Near the lower portion of the apparatus there is also provided a shaft 406 secured to supporting members 11 and 12 by means of bearings 399 and 400 and bolts 399a and 400a respectively. On the end of this shaft a suitable arm or lever 401 is provided which projects upwardly, and at 402 another horizontally disposed member is secured. This apparatus controls the operation of the clutch mechanism to start and stop the apparatus. By manipulating lever 401 the clutch in the body forming machine is operated and the machine is started or stopped.

Although the method of operation of the various mechanisms in the apparatus have been set forth in conjunction with a detailed description thereof, it is believed that a brief recital of the method of operation of the various mechanisms and their co-ordination with each other is in order.

Let us assume that the apparatus is placed in position at the feed end of a body forming machine and is connected thereto and with the chain 25 mounted on a sprocket in the body forming machine as well as on the sprocket 24 of the apparatus and the ratio between the two sprockets is five to one so that main drive shaft 17 of the apparatus will have imparted thereto one complete revolution for each five revolutions of the main drive shaft of the body forming machine on which the smaller sprocket is mounted. The body forming machine and the associated machines are all driven in synchronized relation to each other when in operation and of course this starts the main drive shaft 17 of the apparatus in operation. Let us assume that a stack of sheets 40 is in position on the support 36 and when the machine is ready for operation let us assume that the roller 42 (see Fig. 14) will be in the portion of groove 41 which is uppermost in Figure 14 in closed cam 19 and the vacuum cups will be in their highest position and fitting against the lower end of guides 95 and 94. As the main drive shaft 17 continues rotation in a counter-clockwise direction in Figure 14 roller 42 will move until it is positioned in the portion of the groove which is lowermost in Figure 14 and the vacuum cups will be in their lowermost position and will pick up the topmost sheet 40 on the stack of sheets and as cam 19 continues rotation the vacuum cups will be raised upwardly with a sheet picked up thereby and when the vacuum cups have reached their highest position as shown in Figure 19, members 162 and 177 will be in their outermost position or advanced all the way to the left in Figure 19 and when the picked up sheet is in its uppermost position the members 162 and 177 will move to the right in Figure 19 and the hooks on the lower end thereof will engage the outer edge of the raised sheet and move it into the apparatus. At the same time the dogs 108 will be raised to horizontal position to guide the sheet 40 into the apparatus to what is known as first position and these hooks pull the sheet 40 across the vacuum cups and when the edge of the sheet passes one edge of the vacuum cups the vacuum is broken and valve 97 therein will close the suction pipes to the vacuum cups and the sheet 40 is moved to what is termed first position and in the same revolution of shaft 17 the ends of sheet 40 are sheared to cause the sheet to be of the proper length for a given number of blanks. The shearing operation on the ends of the sheet is controlled by cam 22 in Figure 20 and the flat portion thereof allows the shearing plates 205 and 206 as shown in Figure 9 to move downward and to shear a small portion from each end of the sheet while in its first position. After the shearing operation is completed the sheet is moved to its second position in the apparatus on the third revolution of the shaft 17 by the mechanism associated with rods 216 and 232 controlled by cam 20 as seen in Figure 17. This causes the lugs or latches 221 to engage the edge of sheet 40 and move it to second position in the apparatus ready to be moved step by step endwise of itself and laterally of the apparatus and to have the blanks sheared from the end thereof.

This movement to second position is done quickly by sunken portion in cam 20 which allows movement of the sheet to second position.

In other words, on the first revolution of shaft 17 the vacuum cups pick up a sheet and raise it to a level where it will be inserted into the apparatus. On the second revolution the first sheet is pushed to the first position in the apparatus by members 162 and 177 on rods 159 and 174 where it is sheared by shearing plates 205 and 206 on the same revolution and in the meantime the vacuum cups are raising a second sheet to a level where it will be inserted into the apparatus. On the third revolution the first sheet is pushed to a second position in the apparatus while the second sheet is pushed to the first position and sheared and during the same revolution the vacuum cups pick up a third sheet and raise it to a level where it will be pushed into the machine. On the fourth revolution the first sheet is moved to five different positions laterally of the machine by means of the mechanism associated with barrel cam 23 and during each position, excepting the last, shearing plate 232 which is operated by cam 18 shears a body blank from the sheet. During the same revolution the second sheet is moved to the second position in the apparatus and the third sheet is moved to the first position in the apparatus and sheared while a fourth sheet is raised to a level where it is inserted in the apparatus. The movement of a sheet to a second position is delayed and takes place rapidly immediately after the last blank of a preceding sheet is moved out of the apparatus. This delayed and quick movement is accomplished by the cavity in the periphery of cam 20.

In the drawings and specification, there has been set forth a preferred embodiment of the invention, and although specific terms are employed, they are used in a generic and descriptive sense only and not for purposes of limitation, the scope of the invention being set forth in the appended claims.

We claim:

1. Apparatus for preparing blanks and delivering the same to a body forming machine comprising means for feeding a sheet of blank material sidewise into and longitudinally of the apparatus, means for moving the sheet step by step endwise of the sheet and laterally of the apparatus, means for completely severing the leading end of the sheet each time it is moved laterally through the machine until the last blank remains, means for successively positioning said blanks and feeding them into a body forming machine and means for driving the apparatus in timed relation to the body forming machine so that a blank will be fed to the body forming machine each time a blank is cut, the means for moving the sheet endwise comprising a dog for engaging the trailing end of the sheet to push the same for a portion of an intermittent movement and a gripping device for engaging the leading end of the sheet and pulling it through the remainder of an intermittent movement.

2. Apparatus for cutting blanks from sheet material and feeding the blanks into a body forming machine comprising means for picking up one sheet at a time and moving the same laterally of itself into the apparatus, means for moving the sheet step by step endwise of itself through the apparatus, means for completely severing the leading end of said sheet each time the same is moved step by step, excepting the last time it is moved, means for successively positioning and feeding the blanks into the body-forming machine and means for driving the apparatus in timed relation to the body forming machine so that a blank will be fed to the body forming machine each time it is ready to receive a blank, the means for moving the sheet endwise comprising a dog for engaging the trailing end of the sheet to push the same for a portion of an intermittent movement and a gripping device for engaging the leading end of the sheet and pulling it through the remainder of an intermittent movement.

3. Apparatus for cutting and feeding blanks to body-forming machines comprising means for positioning sheets of blank material, means for picking up one sheet at a time and moving said sheet sidewise and in a longitudinal direction into the machine, means for shearing the ends of the sheet, means for then moving the sheet farther into the apparatus, means for moving the sheet endwise step by step laterally of the machine, means for completely severing the leading end of said sheet step by step as it is fed laterally of the machine, means for successively positioning said cut blanks and feeding the same into the body forming machine, the means for moving the sheet endwise comprising a dog for engaging the trailing end of the sheet to push the same for a portion of an intermittent movement and a gripping device for engaging the leading end of the sheet and pulling it through the remainder of an intermittent movement.

4. Apparatus for cutting and feeding blanks to a body forming machine comprising means for positioning sheets of blank material, means for picking up one sheet at a time and moving said sheet sidewise and in a longitudinal direction into the machine, means for shearing the ends of the sheet, means for then moving the sheet farther into the apparatus, means for moving the sheet endwise step by step laterally of the machine, means for severing the leading end of said sheet step by step as it is fed laterally of the machine, means for successively positioning said cut blanks and feeding the same into the body forming machine, and means for driving the apparatus in timed relation to the body forming machine so that a blank will be fed to the body forming machine each time it is ready to receive a blank, the means for moving the sheet endwise comprising a dog for engaging the trailing end of the sheet to push the same for a portion of an intermittent movement and a gripping device for engaging the leading end of the sheet and pulling it through the remainder of an intermittent movement.

5. Apparatus for cutting blanks from sheets of material and delivering the blanks to a body-forming machine comprising means for picking one sheet at a time from the top of a stack of sheets disposed flatwise, means for moving the sheet sidewise longitudinally of the machine, means for shearing the ends of the sheet, means for then moving the sheet farther into the apparatus, means for moving the sheet step by step endwise of itself and laterally of the machine, means for completely severing the leading end of said sheet and means for positioning and conveying said cut blanks into the body forming machine, the means for moving the sheet endwise comprising a dog for engaging the trailing end of the sheet to push the same for a portion of an intermittent movement and a gripping device for engaging the leading end of the sheet and pulling it through the remainder of an intermittent movement.

6. Apparatus for cutting and feeding blanks into a body forming machine comprising vacuum means for engaging a sheet of material and moving the same into the apparatus, means for severing the ends of the sheet, means for moving the sheet of material endwise of itself step by step in the apparatus, means for severing the leading end from said sheet after each step by step movement thereof, except the last movement, and means for feeding the blanks into the body forming machine, the means for moving the sheet endwise comprising a dog for engaging the trailing end of the sheet to push the same for a portion of an intermittent movement and a gripping device for engaging the leading end of the sheet and pulling it through the remainder of an intermittent movement.

7. Apparatus for cutting and feeding blanks into a body forming machine comprising vacuum means for engaging a sheet of material and moving the same into the apparatus, means for moving the sheet of material endwise of itself step by step in the apparatus, means for severing the leading end from said sheet after each step by step movement thereof, except the last movement, means for feeding the blanks into the body forming machine, the means for engaging and moving a sheet of material into the apparatus being timed with relation to the means for moving the sheet of material step by step to position another sheet of material in position for step by step movement as the last blank in the preceding sheet is placed in position for feeding into the body-forming machine, the means for moving the sheet endwise comprising a dog for engaging the trailing end of the sheet to push the same for a portion of an intermittent movement and a gripping device for engaging the leading end of the sheet and pulling it through the remainder of an intermittent movement.

8. Apparatus for cutting blank portions from sheets of material and feeding the blanks or portions into a body-forming machine comprising a plurality of vacuum cups for engaging a sheet of material and moving it sidewise into the apparatus, means interconnecting said plurality of vacuum cups whereby when one does not form a seal all of the cups will be rendered inoperative, means for cutting the ends from the sheet to give it proper length, means for further moving said sheet of material sidewise and longitudinally of said apparatus, means for intermittently moving said sheet endwise itself and laterally of said apparatus and means for intermittently cutting a portion from the leading end of said sheet, means for adjusting the cutting means to determine the length of the portions, and means for moving the cut portions into the body-forming machine.

9. Apparatus for cutting blanks from a sheet of material and feeding said blanks to a body-forming machine comprising means for supporting a plurality of sheets of material disposed one above the other, vacuum means for picking the topmost sheet from off said plurality of sheets and moving it sidewise into the apparatus, means for further moving said sheet endwise and transversely of the apparatus, means for intermittently cutting a blank from the end of said sheet and means for feeding the blanks into the body making machine, the said means for moving the sheets sidewise and longitudinally of the apparatus being adapted to move another sheet into position for movement laterally of the apparatus when the last blank in the preceding sheet has been moved laterally out of the apparatus for feeding into the body forming machine.

10. Apparatus for cutting and feeding blanks to a body-forming machine comprising means for engaging and moving a sheet of material having a plurality of blanks therein into the apparatus, means for cutting the sheet of material to proper size to form a given number of blanks, means for moving the sheet farther into the apparatus, means for intermittently moving the sheet endwise, means for cutting a blank from the leading end of the sheet after each intermittent movement until only one blank remains and means for moving the blanks into the body-forming machine, the means for moving the sheet endwise comprising a dog for engaging the trailing end of the sheet to push the same for a portion of an intermittent movement and a gripping device for engaging the leading end of the sheet and pulling it through the remainder of an intermittent movement.

11. Apparatus for cutting and feeding blanks to a body-forming machine comprising means for engaging and moving a sheet of material having a plurality of blanks therein sidewise into the apparatus, means for cutting the sheet of material to proper size to form a given number of blanks means for intermittently moving the sheet endwise, means for cutting a blank from the leading end of the sheet after each intermittent movement until only one blank remains, means for adjusting the amount of intermittent movement given to the sheet to determine the length of the blanks, and means for moving the blanks into the body forming machine, the means for moving the sheet endwise comprising a dog for engaging the trailing end of the sheet to push the same for a portion of an intermittent movement and a gripping device for engaging the leading end of the sheet and pulling it through the remainder of an intermittent movement.

12. Apparatus for cutting blanks for body-forming machines and the like comprising means for supporting a stack of elongated sheets to be cut into blanks, means for picking up the topmost sheet from the stack and moving it sidewise into the apparatus, movable means for engaging the lower surface of the sheet and guiding it into the apparatus, means for guiding a sheet into proper position on top of the stack when a sheet is picked off the stack and released and allowed to fall back onto the top of the stack of sheets, pushing and pulling means for intermittently moving the sheet endwise and means for cutting a blank from the leading end after each intermittent movement except the last intermittent movement.

13. Apparatus for forming blanks for manufacture of containers comprising means for supporting a stack of sheets of material, vacuum means for picking up one sheet at a time from said stack, means for moving the sheet into the apparatus, means for shearing the ends of said sheet to form it of definite length for a predetermined number of blanks, means for moving the sheet farther into the apparatus means for intermittently feeding the sheet at right angles to the first feeding movements, means for cutting a blank from the leading end of said sheet upon each intermittent movement except the last, the means for intermittently moving the sheet comprising means for engaging the trailing end of the sheet and pushing the same for a portion of its movement and gripping means for engaging the leading end of the sheet and pulling it through the apparatus after it is ceased to be pushed by the means engaging the trailing end.

14. Apparatus for forming blanks from a strip of metal comprising means for feeding the sheet laterally, means for shearing the ends from said sheet, means for then moving the sheet again laterally, means for intermittently feeding the sheet endwise and at right angles to its first two movements, and means operable upon each endwise movement except the last for cutting the leading end from said sheet.

15. Apparatus for cutting a strip of sheet material into a plurality of blanks comprising means for intermittently moving the sheet through the apparatus, severing means operable after each intermittent movement of the sheet except the last movement for severing the leading end from the sheet, the means for moving the sheet comprising means for engaging the trailing end of the sheet and moving it for a portion of its movement and gripping means for engaging the leading end of the sheet and pulling it through the remainder of its intermittent movement.

16. Apparatus for cutting a strip of material crosswise into blanks comprising means for intermittently engaging the two ends of the strip and pushing and pulling it through the apparatus, and means operable between intermittent movements of the sheet for severing the leading end of the sheet to form a blank.

17. Apparatus for cutting blanks from sheets of material comprising means for holding a stack of superposed sheets, vacuum means for picking the topmost sheet from the stack, means for moving the picked up sheet into the apparatus, means for clamping the sheet and cutting the ends therefrom to form a sheet of the requisite length, means for transferring the sheet farther into the apparatus, means for intermittently moving the sheet at right angles to its preceding movements, and means for severing the leading end portion of the sheet upon each intermittent movement up to, but not including, the last movement.

18. A machine for cutting blanks from sheet material comprising means for feeding a sheet into the machine, means for feeding the sheet farther into the machine, means for intermittently feeding the sheet laterally of the machine, means operable after an intermittent movement of the sheet for severing the leading end therefrom, the means for feeding the sheet farther into the machine being operable as the last blank of the preceding sheet is moved from the machine.

19. A machine for cutting blanks from sheet material comprising means for feeding a sheet into the machine, means for clamping the sheet and cutting the ends therefrom, means for moving the sheet farther into the machine, means for engaging the sheet and moving it intermittently at right angles to its first two movements, means operable after each intermittent movement for severing a blank from the leading end of the sheet, the means for moving the sheet farther into the machine being operable as the last portion of the preceding sheet is intermittently moved.

CHARLES V. STRICKLAND.
WILLIAM O. MORGAN.